United States Patent [19]

Takeda et al.

[11] Patent Number: 5,315,460
[45] Date of Patent: May 24, 1994

[54] MAGNETIC RECORDING AND REPRODUCING APPARATUS INCLUDING S FIXED CHASSIS FOR SUPPORTING A HEAD DRUM AND A MOVABLE CHASSIS FOR MOUNTING A TAPE CASSETTE

[75] Inventors: Hidekazu Takeda; Masao Iwakura; Nobuo Masuoka; Tetsuo Itou, all of Kanagawa; Ikuo Nishida, Ibaraki; Yoshiharu Yamashita, Ibaraki; Motonori Ohmori, Ibaraki; Koji Iyota, Ibaraki, all of Japan

[73] Assignees: Hitachi, Ltd., Tokyo; Hitachi Engineering, Inc., Yokohama, both of Japan

[21] Appl. No.: 89,597

[22] Filed: Jul. 12, 1993

Related U.S. Application Data

[63] Continuation of Ser. No. 654,799, Feb. 13, 1991, abandoned.

[30] Foreign Application Priority Data

Feb. 16, 1990 [JP] Japan .................. 2-33778

[51] Int. Cl.$^5$ .................. G11B 5/027; G11B 15/60
[52] U.S. Cl. .................. 360/85; 360/95
[58] Field of Search .......... 360/85, 95, 130.2-130.23, 360/84, 96.5

[56] References Cited

U.S. PATENT DOCUMENTS

| | | | |
|---|---|---|---|
| 4,807,077 | 2/1989 | Zaitsu et al. | 360/95 |
| 4,949,203 | 8/1990 | Kunimaru et al. | 360/95 |
| 4,991,038 | 2/1991 | Grant et al. | 360/95 |
| 4,991,039 | 2/1991 | Kaku | 360/95 |
| 5,041,928 | 8/1991 | Sasaki et al. | 360/95 |
| 5,067,035 | 11/1991 | Kuldeski et al. | 360/95 |
| 5,089,921 | 2/1992 | Kodama et al. | 360/95 |
| 5,113,296 | 5/1992 | Kaneko et al. | 360/95 |
| 5,166,843 | 11/1992 | Kuwajima | 360/85 |
| 5,168,399 | 12/1992 | Kano et al. | 360/95 |
| 5,195,001 | 3/1993 | Murakami et al. | 360/85 |
| 5,214,547 | 5/1993 | Kondo | 360/85 |
| 5,216,565 | 6/1993 | Yamaguchi | 360/85 |
| 5,231,551 | 7/1993 | Zaitsu et al. | 360/85 |
| 5,239,432 | 8/1993 | Kuroda | 360/85 |

FOREIGN PATENT DOCUMENTS

| | | |
|---|---|---|
| 0227917 | 11/1986 | European Pat. Off. . |
| 0291340 | 5/1988 | European Pat. Off. . |
| 0329180 | 2/1989 | European Pat. Off. . |
| 61-11961 | 1/1986 | Japan .................. 360/85 |
| 8493790 | 9/1984 | PCT Int'l Appl. . |

OTHER PUBLICATIONS

Patent Abstracts of Japan, vol. 10, No. 160 (P-465) (2216) 7 Jun. 1986; and JP-A-61 13 466 (Toshiba) 21 Jan. 1986.

Primary Examiner—Stuart S. Levy
Assistant Examiner—Jefferson Evans
Attorney, Agent, or Firm—Antonelli, Terry, Stout & Kraus

[57] ABSTRACT

A tape running guide and tape loading mechanism for a magnetic tape recording and reproducing apparatus including a tape guiding system having, at a tape supply side, at least a first movable slanted pin and a first movable tape height regulating guide roller for deriving a tape from an open space of a magnetic tape cassette and winding the tape on a cylindrical drum, a second slanted pin and a second tape height regulating guide roller and third movable guide pin for winding the tape on the second slanted pin. At a tape returning side, a fourth movable slanted pin and a fourth movable tape height regulating guide roller for deriving the magnetic tape from the open space of the tape cassette and winding the magnetic tape on the cylindrical drum a fifth movable slanted pin and a pinch roller which are to be derived from the open space of the tape cassette and a capstan in arranged outside the open space. The movable tape guide members are movable in the common area and a time-shared manner to thereby make the loading mechanism compact.

7 Claims, 9 Drawing Sheets

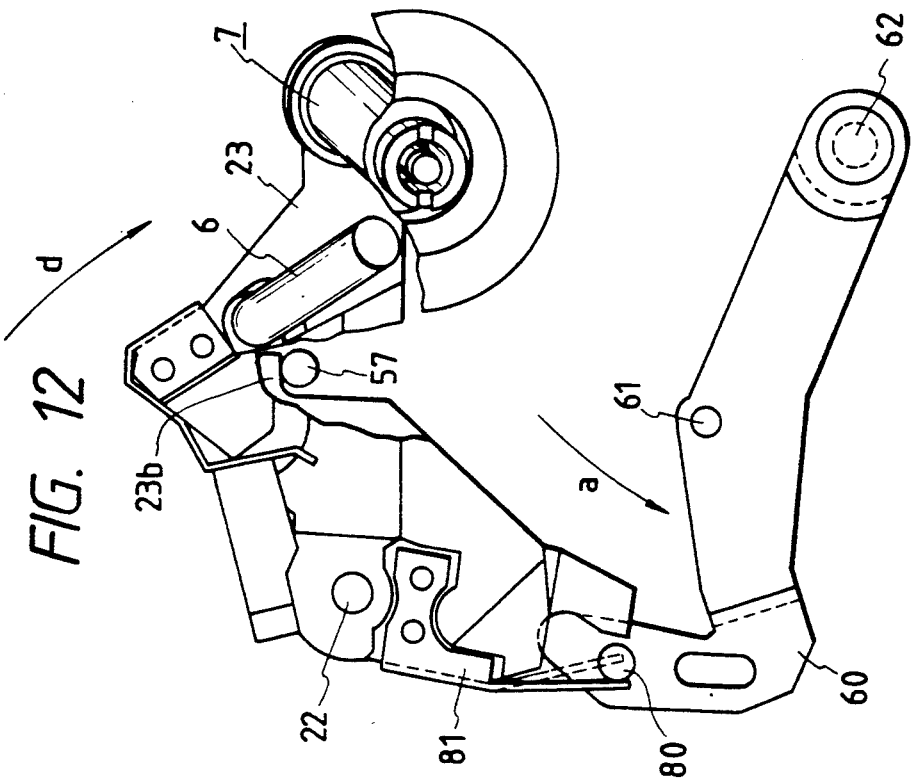

MAGNETIC RECORDING AND REPRODUCING APPARATUS INCLUDING S FIXED CHASSIS FOR SUPPORTING A HEAD DRUM AND A MOVABLE CHASSIS FOR MOUNTING A TAPE CASSETTE

This application is a continuation application of Ser. No. 07/654,799 filed Feb. 13, 1991, which is now abandoned.

BACKGROUND OF THE INVENTION

The present invention relates to a helical scan magnetic recording and reproducing apparatus and, more particularly, to a magnetic tape guiding and tape loading mechanism of such an apparatus, which is suitable to enable a reduction in the size of the magnetic recording and reproducing apparatus in area and thickness.

For a helical scan magnetic recording and reproducing apparatus (VTR) its compactness in area and thickness is highly desirable in view of the portability thereof when applied to a VTR combined with a video camera such as an 8 mm video camera. In a VTR, a tape drive mechanism may occupy a large space thereof; therefore, a reduction of such space contributes to a compactness of a VRT.

In order to minimize the size of a tape drive mechanism, in Japanese Kokai (P) 63-239646, to reduce the thickness of the tape drive mechanism, a head cylinder device is arranged such that a portion of a cylindrical drum of the head cylinder device is received in a space provided in a front portion of a tape cassette and covered by an internal flap for tape protection in accordance with industrial standards, with the flap being opened when the tape cassette is inserted. For a tape loading, a so-called M loading system is provided wherein a portion of a magnetic tape is supplied from a tape cassette in parallel between a point on a supply reel side and point on a winding reel side of the tape cassette and helically wound on the cylindrical drum over a predetermined angle and is usually used in a VHS type VTR to reduce the thickness of the tape mechanism.

In the above proposed construction, a level of a center of the tape in a width direction on height regulating guide rollers provided in a tape supplying area and in a tape return area in the vicinity of the cylindrical drum for supplying the tape in parallel from the space of the cassette, is equal to a level of a center of the tape within the cassette at a time when the loading operation of the tape is completed.

In the proposed conventional technique, a pair of slanted posts for helically winding the tape on the cylindrical drum must be respectively positioned in the vicinity of the tape supplying and return areas. Therefore, an inclination angle and orientation of the cylindrical drum with respect to a reference plane of the apparatus and the height of the rotational center of the magnetic head mounted on the cylindrical drum with respect to a reference plane including a center line of the magnetic tape within the tape cassette are restricted.

More particularly, presuming a coordinate system having an original point corresponding to a rotational center of the magnetic head an X-axis extending in parallel to a straight line passing through the original point and connecting centers of the supply and winding reels in the tape cassette and a Y-axis passing through the original point and orthogonal to the X-axis, the orientation of the cylindrical drum is substantially within a third quadrant of this coordinate system, that is, the cylindrical drum is slanted toward the supply reel, and the inclination angle thereof is about 11° to 12°. Further, the level of the rotational center of the magnetic head is lower than the level of the center line of the magnetic tape within the cassette by several millimeters.

With such a head-cylinder arrangement, the amount of the cylindrical drum to be received in the open space of the tape cassette is very limited.

Further, since the inclination angle of the cylindrical drum exceeds 10°, the thickness of this mechanism, which depends upon the position of a lower edge of the cylindrical drum, is increased.

That is, there is a limitation in a gap between the inserted tape cassette and the cylindrical drum and there is a limitation in the size of the space to be occupied by the cylindrical drum, preventing the tape drive mechanism from being minimized.

In order to solve this problem and to allow the size of the tape drive mechanism to be made as small as possible, Japanese Patent Application No. 288912/1989 proposes arranging a cylindrical drum in a reference plane orthogonal to a straight line connecting rotational centers of the supply and take-up reels within a cassette and inclined toward the cassette with a predetermined angle of 6° to 8° from a straight line orthogonal to a plane on which the cassette is mounted and to make a winding angle of the magnetic tape on the cylindrical drum symmetrical with respect to the reference plane.

SUMMARY OF THE INVENTION

An object of the present invention is to provide a tape winding guide and tape loading mechanism enabling the above mentioned cylindrical drum arrangement to be more compact and thinner.

In order to achieve the above object, according to the present invention, a three-dimensional loading system is employed in which a level of tape fed to a cylindrical drum is made high and that of the tape leaving the cylindrical drum is made low. A tape guide system includes, in the tape feeding side, first movable means including a first slanted pin and a first slanted guide roller for deriving the tape from an open space of a magnetic tape cassette and winding the tape on the cylindrical drum, second movable means including a second slanted pin and second slanted guide roller and third movable means including a tension pin and a guide roller for winding the tape on the second slanted pin and, at the tape return side, fourth movable means including a fourth slanted pin and a fourth slanted guide roller for withdrawing the magnetic tape from the open space of the tape cassette and winding the magnetic tape on the cylindrical drum and fifth movable means including a fifth slanted pin and a guide pin which are to be derived from the open space of the tape cassette at a capstan arranged outside the open space.

These movable tape guide members are movable in a common area in a time shared manner to make the loading mechanism compact.

With the cylindrical drum arrangement, an upper surface of the rotary cylinder becomes parallel to an opened internal flap of the tape cassette in a direction parallel to a straight line connecting centers of the supply reel and a take-up reel of the magnetic tape cassette. Therefore, when the rotary cylinder is partially received in the open space of the tape cassette with minimum necessary clearance, the rotary cylinder can be arranged such that a rotational center of the magnetic head becomes highest compared with that of any other inclination of the cylinder. Thus, it is possible to reduce the thickness of a space to be occupied by the rotary cylinder within the mechanism.

In the tape running system of the present invention, it is important to acquire a tape span in each of the tape supply side and the tape take-up side of the drum, which must be long enough to smoothly shift a level of the tape, while restricting a frictional loss due to sliding contact between the running tape and the tape guide members.

In the present invention, the tape winding angle on the drum on the tape supply side is maintained as small as possible by the slanted pin in the vicinity of the drum and a vector of the tape, in its running direction, is directed to the cassette while maintaining the tape winding angle on the slanted pin by the tape height regulating guide roller movable together with the slanted pin to thereby correct vertical deviation of the tape center within a limited area.

That is, the tape span in the tape supply side of the drum is given by the second height regulating guide roller which contacts with the magnetic surface of the tape and, by oppositely turning the vector of the tape in the running direction, the deviation of the tape attitude (twisting) is corrected by the second slanted pin.

The second slanted pin and the second tape height regulating guide roller are mounted on an arm rotatably supported by a pin on the main chassis and retracted, during which retraction, the slanted pin, and the height regulating guide roller, provided, on the tape supply side, are supplied from the open space of the tape cassette and pass through around the cylindrical drum.

After these members are passed through the area, the second slanted pin and the second guide roller are put in the tape running path to form a final tape running system. Further, while the tape winding angle on the second slanted pin is maintained by the third guide pin, the tape running direction vector is changed through the tension pin to the tape exit of the cassette.

The third guide pin serve to withdraw the tape from the cassette open space in the initial stage of the loading and to regulate the tape running height in a position closer to the cylinder.

In the tape return area, the tape winding angle on the drum is maintained by the slanted pin arranged on the vicinity of the cylinder and the tape running direction vector is changed toward the capstan. Further, the tape span necessary for correction of height deviation of the tape in the return area is maintained by the second slanted pin and the tape attitude is also thereby corrected.

The second slanted pin is withdrawn from the open space of the tape cassette and contacts with the base surface of the tape. Therefore, it is possible to restrict the increase of tension on the magnetic tape. Further, since it is possible to provide a downward vector to the tape due to the fact that the tape is withdrawn during the initial stage of loading, it is possible to prevent the lower edge of the lowering tape from being physically damaged by the flange portion of the tape height regulating guide roller.

BRIEF DESCRIPTION OF THE DRAWINGS

FIG. 11 is an enlarged plan view of an arm and cam portion of the mechanism in an unloading condition; and FIG. 12 is a similar view to FIG. 11, at a loading completion.

DETAILED DESCRIPTION

Figure 1:
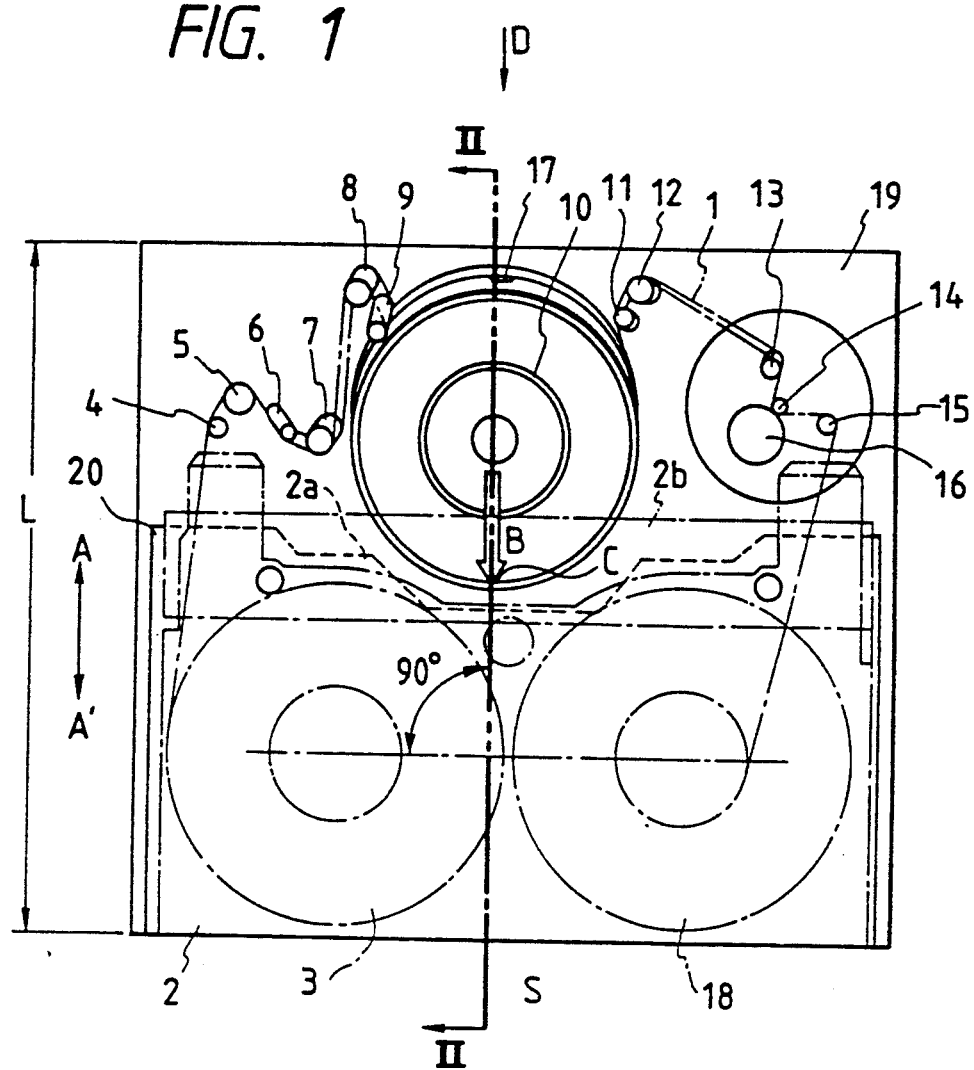
FIG. 1 is a plan view of an embodiment of a magnetic recording and reproducing apparatus according to the present invention.

Referring now to the drawings wherein like reference numerals are used throughout the various views to designate like parts and, more particularly, to FIG. 1, according to this figure, a magnetic recording and reproducing apparatus according to the present invention includes a main chassis 19 and a movable chassis 20. A tape cassette 2, including a supply reel 3 for supplying a magnetic tape 1 and a winding reel 18 for winding the tape, is inserted substantially horizontally and then downwardly onto the chassis 20 which is movable in the direction of the arrows A, A' by a predetermined distance. The cassette 2 has an open space 2a usually covered by an internal flap 2b. A rotary cylinder 10 of a cylindrical drum is mounted on the main chassis 19 and, at a tape supply side thereof, a tension pin 4, a guide roller 5, a slanted pin 6, slanted guide rollers 7, 8, and a slanted pin 9 are arranged. At a tape take-up side of the rotary cylinder 10, a slanted pin 11, a guide roller 12, a slanted pin 13, a capstan 14, a guide pin 15 and a pinch roller 16 are arranged along a tape path in the manner illustrated in the drawings. At least a magnetic head 17 is arranged on a cylindrical drum supported by the rotary cylinder 10.

It should be noted that, in this embodiment, the cylindrical drum and the tape cassette 2 are arranged in a common area to reduce a thickness of the mechanism when the cassette is completely loaded.

In FIG. 1, the cylindrical drum is fixed through a cylinder support member (not shown) to the main chassis 19. When there is no tape cassette mounted in the apparatus, the movable chassis 20 takes a limit position remotest from the rotary cylinder 10 in the direction of the arrow A'.

When the tape cassette 2 is inserted through a cassette insertion hole (not shown), the cassette 2 is fixedly mounted on the movable chassis and the internal flap 2b thereof is opened to expose the open space 2a of the cassette 2. Then the movable chassis 20 is moved in the direction of the arrow A to position the tape cassette 2 in a limit position closest to the rotary cylinder 10 thereby completing a cassette loading operation. In this state, a portion of the rotary cylinder 10 is received in the open space 2a of the tape cassette as shown in the drawings.

In conjunction with the above movement of the movable chassis 20, the tension pin 4, the guide rollers 5, 8 and the slanted pin 9, which are mounted on the movable chassis 20 and positioned initially in an area corresponding to the open space 2a at the side of the supply reel 3 of the cassette 2, and the slanted pin 11, the guide roller 12, the slanted pin 13, the guide pin 15, and the pinch roller 16, which are also mounted on the movable chassis 20 and positioned initially in an area corresponding to the open space 2a at the side of the take-up reel 18 of the cassette 2, are moved outwardly to withdraw the magnetic tape 1 from the cassette 2. Then a tape loading operation is performed to thereby helically wind the tape on the rotary drum.

FIG. 1 shows the state of this mechanism after the tape loading is completed wherein the magnetic tape 1 is wound on the rotary cylinder 10 helically over a predetermined angle. In this state, a running path of the magnetic tape 1 in the tape supply side is defined by the guide roller 5, the slanted pin 6, the slanted guide rollers 7, 8 and the slanted pin 9 and, at the tape take-up side, is defined by the slanted pin 11, the slanted guide roller 12, the slanted pin 13 and the guide pin 15. The magnetic tape 1 is pinched between the capstan 14 and the pinch roller 16 both arranged between the slanted pin 13 and the fixed guide 15.

It should be noted that, in the state shown in FIG. 1, the tension pin 4, the guide rollers 5, 7 and the slanted pin 6 are closer to the tape cassette 2 than the guide roller 8 and the slanted pin 9 and, similarly, the slanted pin 13, the capstan 14, the fixed guide 15 and the pinch roller 16 are closer to the cassette 2 than the slanted pin 11 and the guide roller 12.

In recording or reproducing, the magnetic tape 1 is withdrawn by rotation of the capstan 14 from the supply reel 3 and taken up by the take-up reel 18 during which a plurality of magnetic heads 17 mounted on the rotary cylinder 10 scan the magnetic tape 1. Tension of the magnetic tape 1 is detected by the tension pin 4 upon which a tape mechanism (not shown), associated with the supply reel 3, is controlled to maintain the tape tension constant.

In the construction mentioned above, the rotational center axis of the rotary drum 10 is in a reference plane S including the section line II—II (FIG. 1) orthogonal to a straight line connecting rotational center of the supply reel and the take-up reel 18 and inclined toward the tape cassette 2 as shown by the arrow B with respect to the main chassis 19, that is, the mounting plane of the tape cassette 2. Therefore, presuming for the sake of simplicity that an upper surface of the rotary cylinder 10 is flat, a height of a point thereon decreases toward the tape cassette 2, with a point C thereon, closest to the cassette 2, being smallest. Thus, when the portion of the rotary cylinder 10 is received in the open space 2a of the tape cassette 2, a lower surface of the internal flat and an upper surface of the rotary cylinder 10 are substantially at the same level in a direction vertical to the arrows A, A'.

Figure 2:
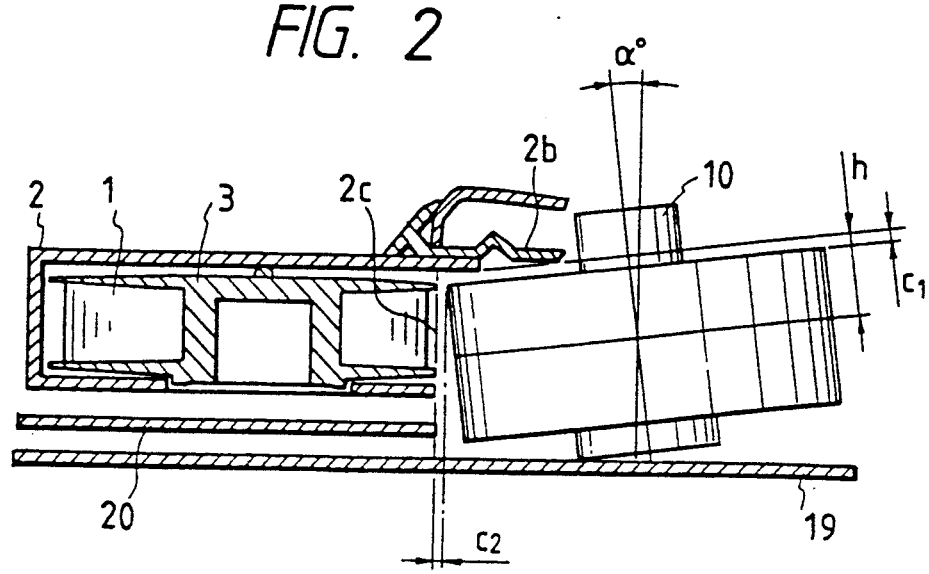
FIG. 2 is a cross-sectional view taken along the line II—II in FIG. 1.

As shown in FIG. 2, the rotary cylinder 10 inclines toward the cassette 2 by an angle α with respect to a straight line in the reference plane S and normal to the main chassis 19. Further, in order to assure a smooth running of the tape while minimizing the size of the device, the portion of the rotary cylinder 10 received in the open space 2a of the tape cassette 2 is given minimal clearances C1, C2 with respect to the internal flap 2b and an inner wall 2c of the open space 2a when the cassette 2 is mounted in the apparatus. As mentioned previously, since the upper surface of the rotary cylinder 10 is substantially at the same level as that of the internal flap 2b of the tape cassette 2 in a direction vertical to the arrow A (FIG. 1), the clearance C1 is also uniform in this vertical direction.

In the conventional proposals mentioned above, since the rotary cylinder 10 is inclined toward the side of the supply reel 3 with respect to the arrow D in FIG. 1 so that the lowest point C on the upper surface of the rotary cylinder 10 opposes supply reel 3, a portion of the upper surface of the rotary cylinder on the side of the winding or take-up reel 18 becomes higher. Therefore, in order to receive such rotary cylinder 10 in the open space 2a of the cassette 2, the rotary cylinder 10 must be arranged in a lower position than in the case shown in FIG. 2 if the same clearance C1 a shown in FIG. 2 is to be provided between the upper surface of the rotary cylinder 10 and the internal flap 2b.

Therefore, the thickness of the conventional structure becomes larger than that obtainable according to the present invention when the thickness of the cylindrical drum and the inclination angle α are selected as the same as those in this embodiment. In other words, in the present invention, it is possible to arrange the rotary cylinder 10 at a higher level than the conventional structure with minimized thickness.

In the present invention in which the clearance C2 with respect to the inner wall 2c of the open space 2a of the tape cassette 2 is selected as a minimum, as shown in FIG. 2, the rotary cylinder 10 can be as near to the mounted tape cassette 2 as possible to thereby reduce the horizontal dimension L (FIG. 1) of the mechanism. Further, in FIG. 1, since the wrapping range of the magnetic tape on the rotary cylinder 10 is symmetrically set with respect to the reference plane S so that the tape guiding mechanism including the guide rollers 8, 12 and the slanted guides 9, 11 which are positioned in the vicinity of the rotary cylinder 10 when the tape loading operation is completed does not take a position outside the rotary cylinder 10, the horizontal dimension L is further prevented from being increased.

Figure 3:
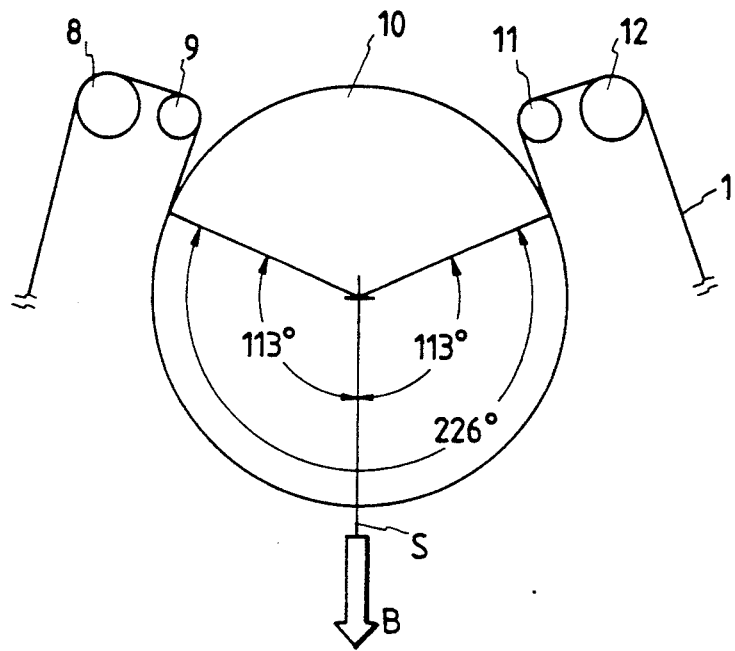
FIG. 3 shows an example of a winding range of the magnetic tape on a rotary cylinder shown in FIG. 1.

For an 8 mm video camera, for example, the wrapping range, that is, the wrapping angle of the magnetic tape 1 on the rotary cylinder 10 may be 226°. In such cases, the rotary cylinder 10 is wrapped with the magnetic tape by 113° on each side of the reference plane S as shown FIG. 3.

Figure 4:
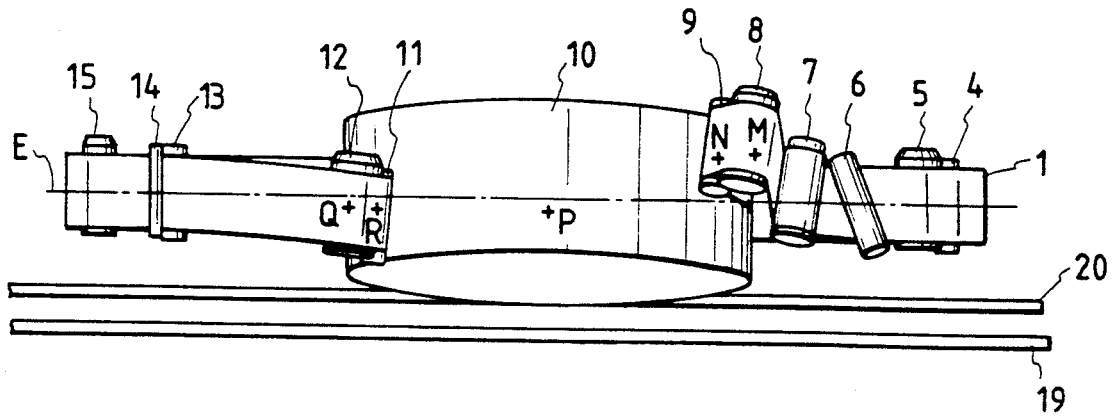
FIG. 4 is a rear view of the embodiment taken in the direction of an arrow D in FIG. 1.

In FIG. 4, a chain line E represents a tape reference center line of the magnetic tape within the tape cassette 2 (FIG. 1). In the state in which the tape loading operation is completed, the magnetic tape 1 is lifted up at the tape supply side of the rotary cylinder 10 with respect to the tape reference center line E by the slanted guides 6, 9 and the guide rollers 7, 8 and is lowered within the wrapping range on the rotary cylinder 10 such that the center line thereof is smoothly shifted from a level above the tape reference center line E to a level below the tape reference center line E. At the tape exiting side of the rotary cylinder 10, the magnetic tape 1 is lifted up by slanted pins 10, 11 and the guide roller 12 such that its center line coincides with the tape reference center line E.

Thus, in this embodiment in which the three dimensional M loading system is employed, the positioning of those movable guide members are performed by a catcher, described more fully hereinbelow, after completion of the loading operation. In this case, the guide roller 8 and the slanted guide 9 among those movable guide members, which protrude upwardly beyond the others, are prevented from protruding upwardly beyond the rotary cylinder 10 and an external flap integral with the internal flap 2b of the tape cassette 2 (FIG. 2). Further, a position of a pressure contact mechanism (not shown) for determining positions of the slanted pin 11 and the guider roller 12 which protrude downwardly determines a lower end of the present mechanism. Therefore, the position of the pressure contact mechanism is such that the magnetic tape 1 is wound on the rotary cylinder 10 at a predetermined inclination angle $\alpha$ (FIG. 2) with respect thereto. In order to make the present mechanism thinner, it is necessary to set the inclination angle $\alpha$ of the rotary cylinder 10 so that a level of the pressure contact mechanism for the slanted guide 11 and the guide roller 12 becomes as high as possible. In this embodiment, the inclination angle $\alpha$ is selected in a range from 6° to 8°.

Further, it should be appreciated in FIG. 4 that a level of a center point M of the magnetic tape 1 on the guide roller 8 is higher than a central point N of the tape 1 on the slanted guide roller 9 which is above the tape reference center line E and a level of a center point Q of the tape 1 on the guide roller 12 which is lower than the tape reference center line E is higher than a center R of the tape on the slanted guide 11. A rotational center point P of the magnetic heads 17 is slightly lower than the taper reference center line E and slightly higher than the center point Q.

Figure 5:
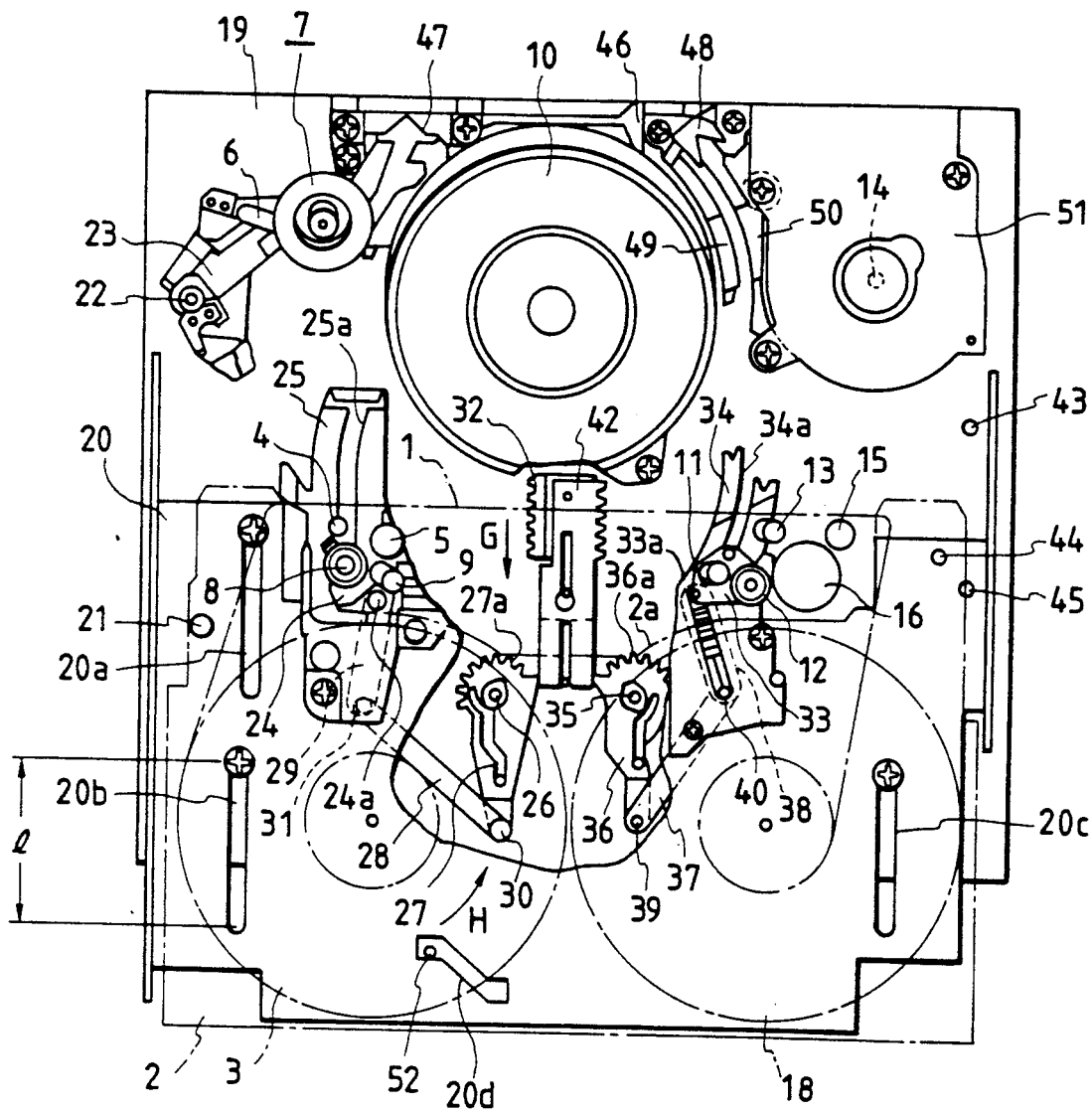
FIG. 5 is a plan view of the mechanism in an unloading state.
Figure 9:
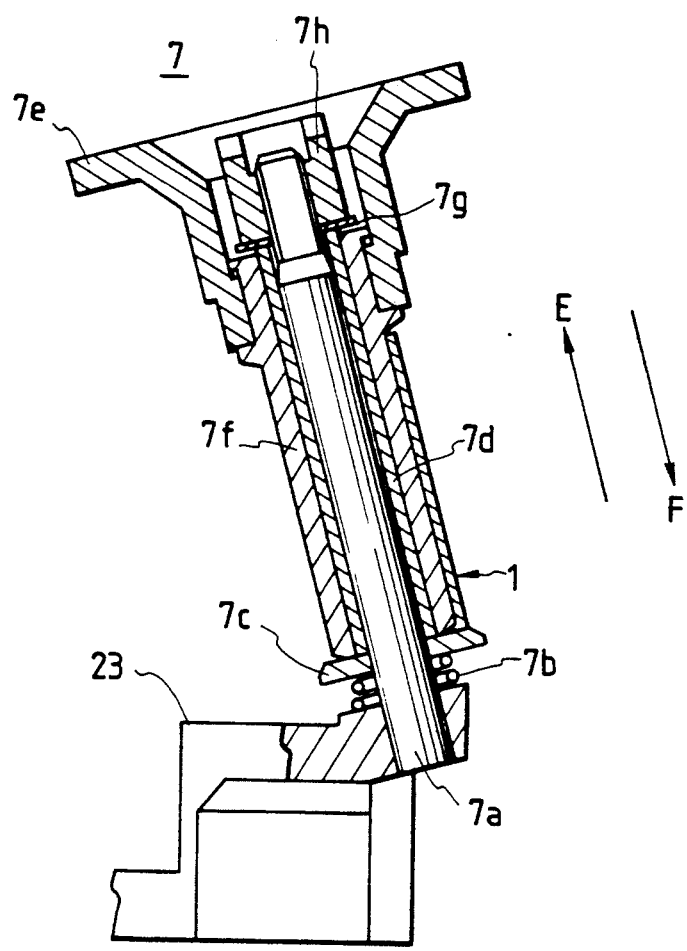
FIG. 9 is a cross-sectional view of a guide roller.
Figure 10:
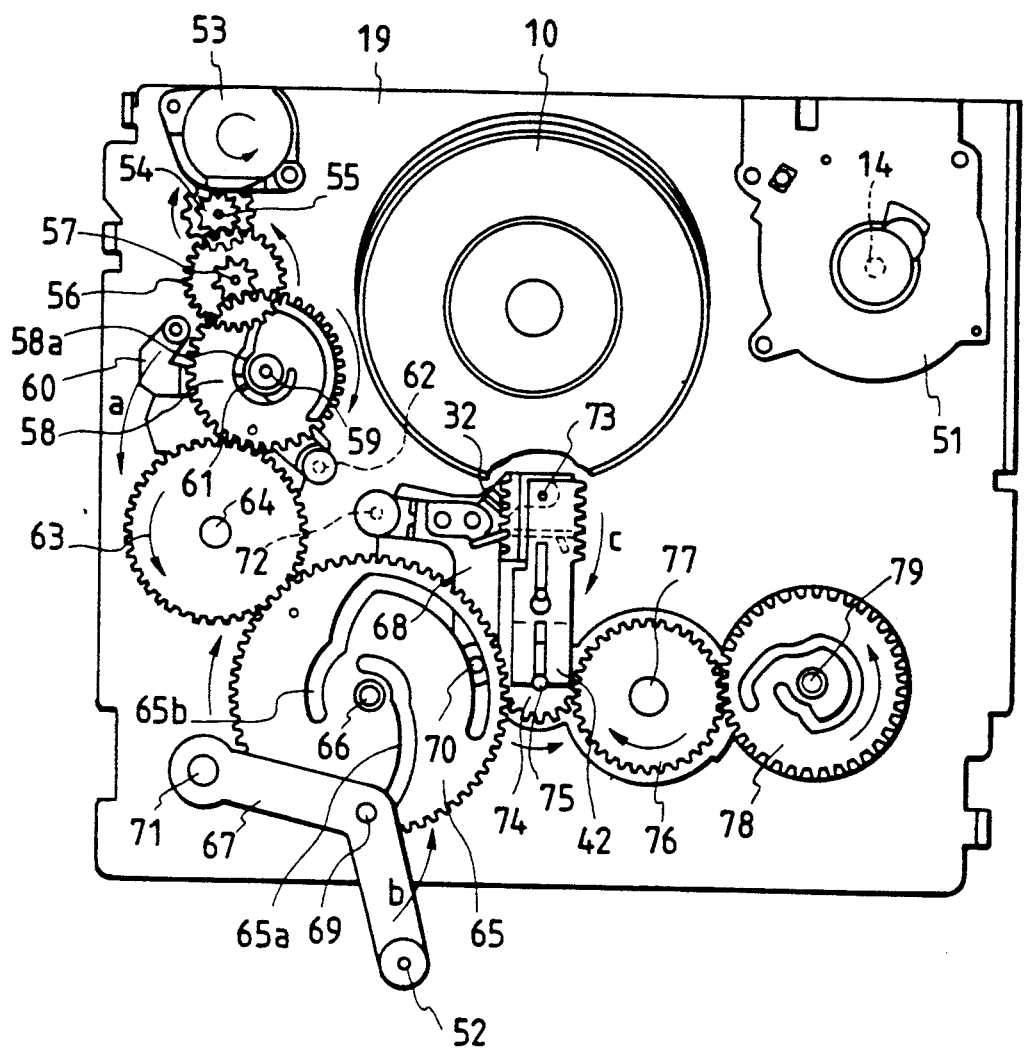
FIG. 10 is a plan view of the loading mechanism on a main chassis in an unloading state.

Referring to FIGS. 5, 9 and 10, at the side of the supply reel 3, the roller 5 and the tension pin 4 are mounted on an arm (not shown) rotatably supported by a pin 21 mounted on the movable chassis 20. The roller 5 and the tension pin 4 are retracted in the illustrated position within the open space 2a of the tape cassette 2 in the unloading state. The guide roller 7 and the slanted pin 6 are mounted on an arm 23 rotatably supported by a pin 22 mounted on the main chassis 19 and held in their first positions shown in the unloading state.

As shown in FIG. 9, guide roller 7 includes a shaft 7a mounted on an arm 23 with a predetermined angle and orientation with respect thereto. A flange 7c, for regulating a lower edge of the magnetic tape 1, is provided on the shaft 7a and a conical compression spring 7b is disposed on the shaft 7a between the flange 7c and the arm 23. A sleeve 7d is fitted on the shaft 7a and a resin roller 7f is provided on the sleeve. A weight 7e is pressure fitted on the resin sleeve 7f so that the weight 7e can rotate together with the resin roller 7f around the sleeve 7d. In order to prevent a disassembly of the sleeve 7d and the roller 7f, a stopper 7h is threadably secured onto a threaded end of the shaft 7a through a spacer or washer 7g.

In this construction, the flange 7c and the sleeve 7d are biased by the compression spring 7d in a direction shown by an arrow E and movable in either of the directions of the arrows E or F along the shaft 7a within a range defined by the position of the stopper 7h. Furthermore, with movement of the flange 7c, the roller 7f and the weight 7e are movable along the shaft 7a. Thus, it is possible to limit the height of the lower edge of the magnetic tape 1 and the regulate the limit.

With regard to the construction of the loading mechanism, as shown in FIG. 5, the guide roller 8 and the slanted pin 9 are mounted on a guide base 24 slidably mounted in an elongated slot 25a of a guide rail 25 threadably secured to the movable chassis 20. The guide rail 25 is linked through links 27, 28 and 29 rotatably supported by a pin 26 mounted on a rear side surface of the movable chassis 20. The link 28 is rotatably connected through a connecting rod 30 to the link 27 and the link 29 is rotatably connected through a connecting supported by the link 29 through a pin 24a pressure fitted on the guide base 24. The link 27 has a geared portion 27a meshing with a rack 32 slidably mounted on the main chassis 19 in a direction shown by an arrow G at the same level as that of the link 27.

At the take-up reel side area of the rotary cylinder 10, the slanted pin 11 and the guide roller 12 are mounted on a guide base 33 slidably mounted in an elongated slot 34a of a guide rail 34 threadably secured to the movable chassis 20. The guide rail 34 is linked through links 36, 37 and 38 rotatably supported by a pin 35 mounted on a rear side surface of the movable chassis 20. The link 37 is rotatably connected through a connecting rod 39 to the link 36 and the link 38 is rotatably connected through a connecting rod 40 to the link 37.

The guide base 33 is rotatably supported by the link 38 through a pin 33a pressure fitted on the guide base 33. A spring 41 is provided for the link 38 for positioning the guide base 33. Similarly to the link 27, the link 36 has a gear portion 36a meshing with a rack 42 slidably provided on the main chassis 19 in a direction shown by the arrow G at the same level as that of the link 36. Further, the slanted pin 13 is mounted on an arm (not shown) rotatably supported by a pin 43 mounted on the main chassis 19.

The pinch roller 16 is mounted on an arm (not shown) rotatably supported by a pin 44 mounted on the movable chassis 20. The fixed guide 15 is also mounted on an arm (not shown) rotatably supported by a pin 43 mounted on the movable chassis 20. In the unloading state, these guides are received in the illustrated positions within the open space 2a of the tape cassette 2. A cylinder base 46 holds the rotary cylinder 10 in a predetermined position on the main chassis 19, with a positioning member 47 positioning the guide base 24 at the loading completion and a positioning member 48 positioning the guide base 33 at the loading completion.

The positioning members 47, 48 are threadably secured by fasteners on the cylinder base 46 similarly to the rotary cylinder 10. Connecting members 49, 50 connect the guide rails 40 and the positioning member 46 and are secured by threaded fasteners onto the main chassis 19. A capstan motor 51 is threadably secured by fasteners in a predetermined position on the main chassis 19. The movable chassis 20 is connected through three elongated slots 20a, 20b and 20c to the main chassis 19 and is movable with respect to the main chassis 19 by a predetermined amount l.

A slot 20d is a slide slot formed in the movable chassis 20 in which a movable chassis drive pin 52 is slidably received so that, when the drive pin moves in a direction of an arrow H, the movable chassis slides toward the rotary cylinder 10.

It should be noted that, in FIG. 5, a portion of the movable chassis 20 is removed to show the arrangement of the racks 32, 42 and links 27, 36. The structure of the loading mechanism arranged on the main chassis 19 will be described briefly with reference to FIG. 10.

It should be noted that FIG. 10 shows various members in an unloading state. A loading motor 53 is threadably secured by fasteners onto the main chassis 19, with a two-step gear 54 being rotatably supported by a pin 55, a second two-step gear 56 being rotatably supported by a pin 57, and a cam gear 58 being rotatably supported by a pin 59. The cam gear 58 includes a cam slot 58a in which a pin 61 mounted on a cam arm 60 for rotating the arm 23 in FIG. 5 is engageably received. The cam arm 60 is rotatably supported by a pin 62 on the main chassis 19. A gear 63 serves as a mechanism switching switch rotatably supported by a pin 64. A cam gear 65 is rotatably supported by a pin 66 for driving the movable chassis 20 and the racks 32, 42. The cam gear is formed with a cam slot 65a for driving the movable chassis 20 and a cam slot 65b for driving the racks 32, 42. Pins 69, 70 mounted on cam arms 67, 68, are respectively engaged with the cam slots 65a, 65b.

The cam arms 67, 68 are respectively rotatably supported by pins 71, 72 on the main chassis 19. One end of the cam arm 68 is engaged with the rack 32 through a pin 73. An intermediate gear 74 is provided having a rotary shaft 75. The rotary shaft 75 also serves as a slide guide for the rack 42. A second intermediate gear 76 is provided having a rotary shaft 77. A cam gear 78 is provided for pressure contact of the controller 16, with the cam gear 78 including a rotary shaft 79. When a loading instruction is supplied to the loading motor 53, the respective gears rotate in directions shown by the respective arrows to rotate the respective cam arms in the directions shown the arrows a, b, and c to thereby perform the loading operation.

Figure 6:
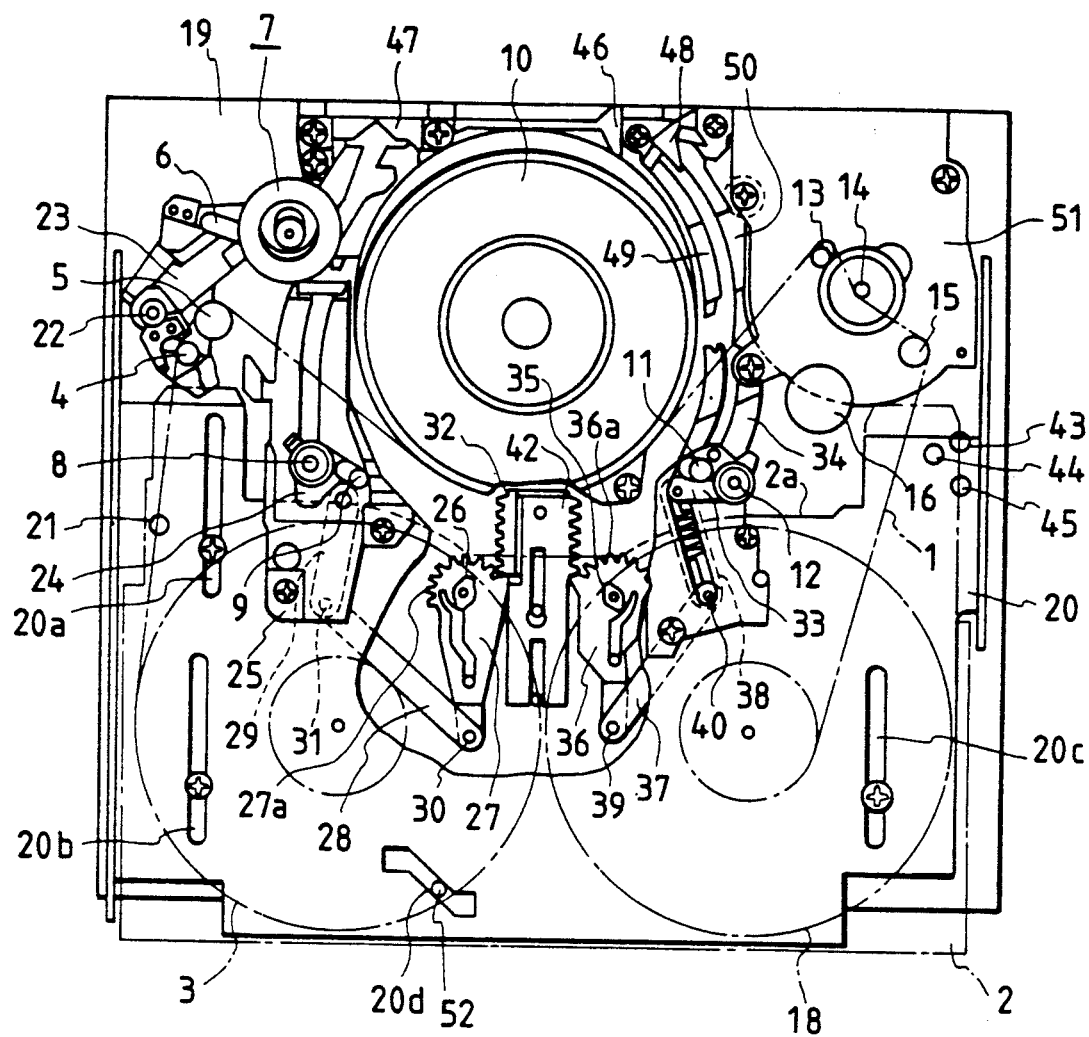
FIGS. 6 and 7 are plan views of the mechanism in different loading conditions.

The operation timings of these guide members in the loading process will be described in detail with reference to FIGS. 6–8. In FIG. 6, the movable chassis 20 is on the way of its slide at which the links 27, 36 are meshed with the respective racks 32, 42. In FIG. 6, the tension pin 4 and the guide roller 5 are derived from the open space 2a of the cassette 2 to the illustrated positions, immediately after the movable chassis 20 starts a sliding motion, and then moved together with the movable chassis 20. On the other hand, the slanted pin 13, the fixed guide 15 and the pinch roller 16 are gradually provided with the sliding motion of the movable chassis 20 from the open space 2a of the tape cassette 2. In the state shown in FIG. 5 at which the links 27, 36 are respectively just in mesh with the racks 32, 42, the guide bases 24, 33 are still in the same fixed positions in the open space 2a as those in the unloading completion state; therefore, the guide bases 24 33 move toward the rotary cylinder 10 by an amount corresponding to a sliding amount of the movable chassis 20. For the arm 23, its position at the unloading completion state (position shown in FIG. 5) is unchanged.

Figure 7:
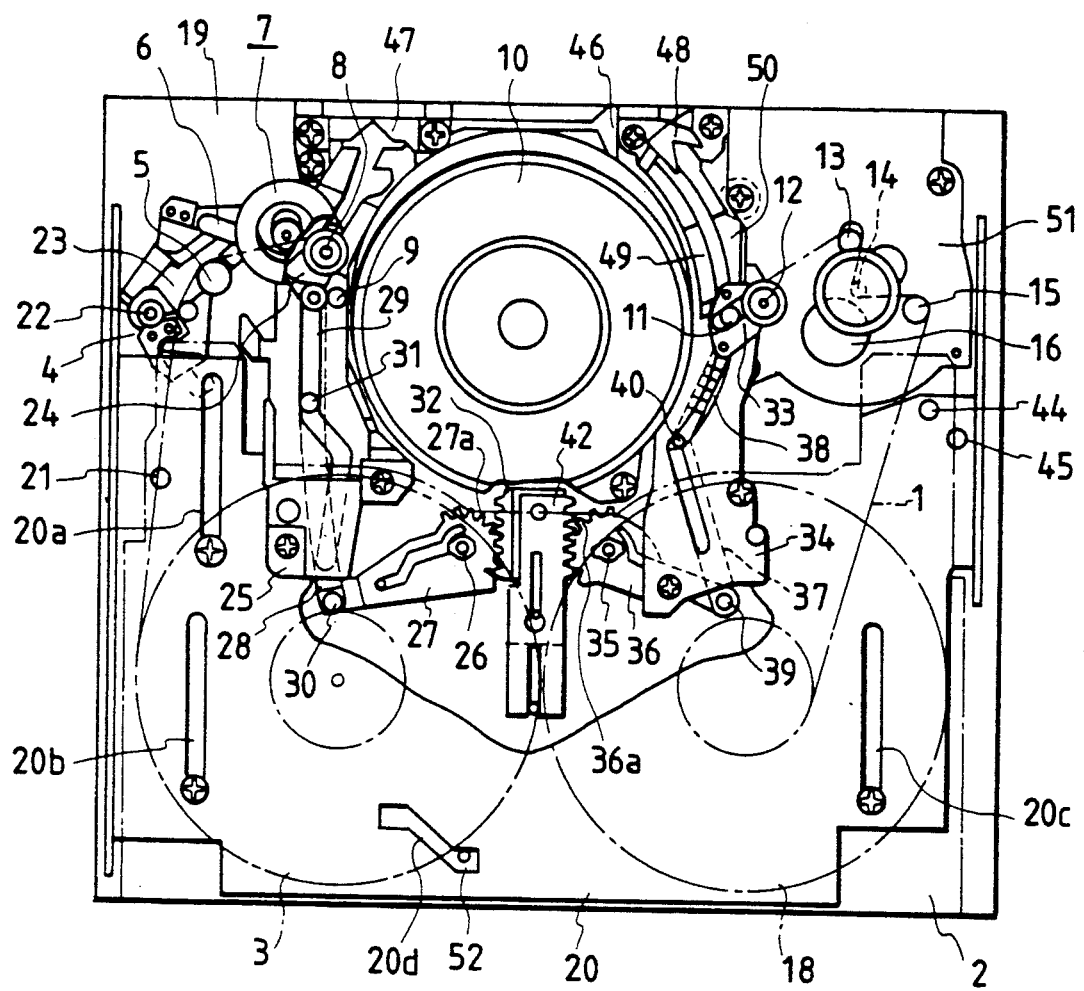

FIG. 7 shows a state of the members when the sliding motion of the movable chassis 20 is completed with the links 27, 36 being respectively meshed with the racks 32, 42. In FIG. 7, the tension pin 4, the slanted pin 13, the fixed guide 15 and the pinch roller 16 are moved from their positions shown in FIG. 6 toward positions attainable when the loading is completed and the links 27, 36 are respectively meshed with the racks 32, 42 to cause the links to respectively rotate around the pins 26, 35. Therefore, the guide bases 24, 33 are moved to the positions shown along the guide slots 25a, 34a of the guide rails 25, 34 while gradually rising and lowering. The position of the arm 23 shown in FIG. 6 is unchanged.

Figure 8:
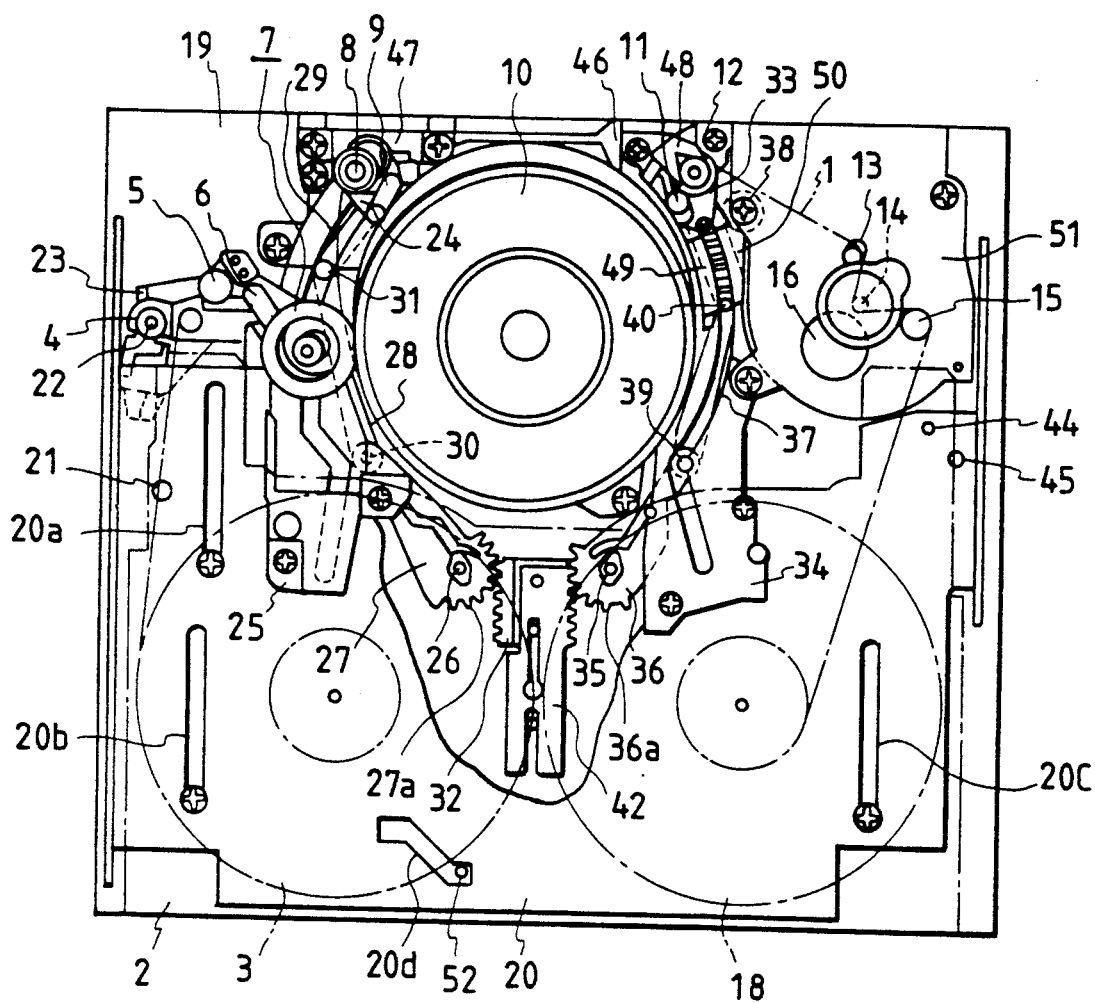
FIG. 8 is a plan view at a completion of a loading operation.

FIG. 8 shows the embodiment when the loading is completed. In FIG. 8, since the racks 32, 42 are moved by predetermined amounts vertically with respect to the plane of the drawing, the links 27, 36 meshing therewith are rotated clockwise and counterclockwise, respectively, to their final states shown in FIG. 8 at which the guide bases 24, 33 are positioned by the positioning members 47, 48, respectively. The racks 32, 42 are driven by rotation of the cam arm 68 in a direction shown by the arrow c in FIG. 10. When the guide base 24 is further moved from the position shown in FIG. 7 with the progress of the loading operation, the arm 23 starts its movement with rotation of the cam arm 60 in a direction shown by an arrow a shown in FIG. 10 up to the final position shown in FIG. 8, completing the loading operation. Thus a final tape path is established.

The operation of the arm 23 will be described in more detail with reference to FIGS. 11 and 12.

FIG. 11 is a plan view showing the arm 23 and the cam arm 60 for driving the arm in the unloading state in an enlarged scale. In FIG. 11, the arm 23 is arranged above the cam arm 60 and a pin 80, mounted on the cam arm 60, engages with a groove 123a formed in a lower surface of the arm 23. Further, a leaf spring 81 having the illustrated contour is provided on the arm 23. In unloading condition, the pin 80 engages with the groove 23a at the illustrated position so that the arm 23 is retracted substantially from the position in the loading completion state.

FIG. 12 is a plan view showing the arm 23 and the cam arm 60 in loading completion state on an enlarged scale. In FIG. 12, upon rotation of the cam arm 60 in a direction shown by an arrow a, the arm 23 rotates in a direction shown by an arrow d in FIG. 12. Since the arm 23 has, on a lower surface thereof, retention face 23b for retaining arm rotation as shown, which contacts with a top end of the gear shaft 57 mounted on the main chassis 19, rotation of the arm 23 is thereby restricted. Further, with further rotation of the cam arm 60, the leaf spring 81 is deformed from the state shown in dotted line to that shown in solid line and a resultant reactive force produces a clockwise moment around the shaft 22. With this rotational moment, the retention face 23b of the arm 23 contacts the shaft 56 with a predetermined pressure. Thus, the position of the arm 23 art the completion of the loading operation is highly precisely maintained.

Therefore, in the present embodiment, the three-dimensional M loading in which a portion of the rotary cylinder 10 to which the tape is supplied is raised and a portion of the cylinder 10 from which the tape exits is lowered can be realized with minimum space requirement, contributing to miniaturization of the mechanism and hence the apparatus. Further, since, in the tape running system of the invention, the guide members are arranged such that the wrapping angle of the tape 1 on each of the slanted pins 6,9, 11 and 13 is minimum, the increase of tension of the tape is minor and so it is possible to stably run the tape 1. Further, since the timing of driving the tape by the guide roller 7 and the slanted pins 6, 13 can be optimized, tape damage due to twisting of the tape during cassette loading is minimized.

As described, according to the tape running system of the present invention, it is possible to maximally increase a portion of the cylindrical drum which is to be received in the open space of the tape cassette and it is also possible to minimize the space and thickness to be occupied by the tape running system. Thus, the magnetic recording and reproducing apparatus can be made very compact with minimum thickness, causing the portability of the apparatus to be substantially improved.

What is claimed is:

1. A magnetic recording and reproducing apparatus comprising a cylindrical drum having a portion receivable in an open space of a magnetic tape cassette when said cassette is in the loaded state in said apparatus, the magnetic tape cassette including a magnetic tape supply reel, a magnetic tape take-up reel and a magnetic tape, said magnetic tape having first and second surfaces on opposite sides of said tape and being helically wound over a predetermined angle on said cylindrical drum in said loaded state of the cassette and scanned by at least a magnetic head upon rotation of said cylindrical drum to record or reproduce an information signal on said magnetic tape;

a fixed chassis supporting said cylindrical drum so that said cylindrical drum is inclined in a direction perpendicular to a segment line connecting centers of the supply and take-up reels of said cassette when said cassette is in said loaded state in said apparatus;

a movable chassis movable with respect to said fixed chassis for mounting said magnetic tape cassette while receiving a portion of said cylindrical drum in said open space of said magnetic tape cassette;

first movable means provided on said movable chassis in an area thereof corresponding to said open space of said tape cassette in a loaded state of the magnetic tape cassette and movable between a first position in a cassette unloading state and a second position in a cassette loading completion state to contact said first surface of the magnetic tape and move the magnetic tape from said tape supply reel toward said cylindrical drum by a length sufficient to smoothly shift a level of the tape upwardly toward said cylindrical drum;

second movable means provided on said fixed chassis so as to be displaceable between first and second positions and adapted to contact said second surface of said magnetic tape to cooperate with said first movable means to form a supply side tape running system for transporting said magnetic tape from said supply reel to said cylindrical drum;

third movable means adapted to cooperate with said second movable means to form the supply side tape running system from said tape supply reel to said cylindrical drum;

fourth movable means provided on said movable chassis in an area thereof corresponding to said open space of said magnetic tape cassette in the loaded state of the magnetic tape cassette and movable between a first position in a cassette unloading state and a second position in a cassette loading completion state to move the magnetic tape from said take-up reel toward said cylindrical drum by a length sufficient to smoothly shift a level of the tape downwardly from said cylindrical drum to said take-up reel, said first and fourth movable means being adapted to cooperate to helically wrap the magnetic tape around said cylindrical drum over a predetermined angle; and fifth movable means adapted to cooperate with said fourth movable means to form a take-up side tape running system from said cylindrical drum to said take-up reel.

2. The magnetic recording and reproducing apparatus claimed to claim 1, wherein said second movable means includes a second slanted pin and a second slanted guide roller, positioned in an area in a vicinity of said cylindrical drum on the side of the tape supply reel of said magnetic tape cassette in the second position of said second movable means, and wherein said first movable means includes a first slanted pin and a first pin and a first slanted guide roller and said third movable means includes a tension pin and a guide roller, said first slanted pin and said first slanted guide roller of said first movable means and said guide roller and said tension pin of said third movable means being in contact with said first surface of the magnetic tape, which is a base surface of said magnetic tape, in the second position of said first and third movable means while said second slanted pin and said second slanted guide roller of said second movable means are in contact with said second surface of said magnetic tape, which is a magnetic surface, in the second position of said second movable means, in such a manner that a center line of said magnetic tape is smoothly shifted upwardly to a level higher than a rotational center of said cylindrical drum and a vector of said magnetic tape coming from said tape supply reel onto said second slanted pin of said second movable means, is parallel to a vector in a direction of an inclination of said second slanted pin while the magnetic tape runs from said supply reel through said third movable means, said second movable means and said first movable means to said cylindrical drum, said supply side tape running system being adapted to transport said magnetic tape extending from said third movable means to said first movable means in a convex loop toward said tape cassette in the loading completion state.

3. The magnetic recording and reproducing apparatus claimed in claim 2, wherein said fourth movable means includes a fourth slanted pin and a fourth slanted guide roller, said fifth movable means includes a fifth slanted pin and a guide pin which are positioned in an area in a vicinity of said cylindrical drum on the side of the tape take-up reel of said magnetic tape cassette in the second position of said fourth movable means, and wherein a capstan is provided in said fixed chassis, said fourth slanted pin and said fifth slanted pin and said guide pin of said fifth movable means being in contact with said base surface of said magnetic tape in such a manner that a center line of said magnetic tape is smoothly shifted downwardly to a level lower than a rotational center of said cylindrical drum and a vector of said magnetic tape coming from said cylindrical drum onto said capstan is parallel to a vector in a direction of an inclination of said fifth slanted pin while the magnetic tape runs from said cylindrical drum through said fourth slanted pin, said fourth slanted guide roller of said fourth movable means to said fifth slanted pin, said take-up side tape running system being adapted to transport said magnetic tape extending between said fourth slanted guide roller and said capstan in a concave loop with respect to said tape cassette in the loading completion state.

4. The apparatus claimed in claim 3, wherein said apparatus operates with a timing such that said tension pin and said guide roller of said third movable means and said fifth slanted pin and said guide pin of said fifth movable means are derived at the same time as said movable chassis on which said tape cassette is mounted starts its movement, said first slanted pin and said first slanted guide roller of said first movable means and said fourth slanted pin and said fourth slanted guide roller of said fourth movable means start to move immediately before said movable chassis completes its movement, said movable chassis completes its movement, said first slanted pin and said first slanted guide roller and said fourth slanted pin and said fourth slanted guide roller move up to the loading completion position after said movable chassis stops, and wherein said second slanted pin and said second slanted guide roller move from the first position of said second movable means to the second position of said second movable means after said first slanted pin and said first slanted guide roller pass through said region substantially common to a moving path of said first slanted pin and first slanted guide roller during a loading process.

5. The apparatus as claimed in claim 2, wherein said second slanted pin and said second slanted guide roller of said second movable member are movable in the loading completion state through a region substantially common to a moving path of said first slanted pin and said first slanted guide roller of said first movable means during a loading process.

6. The apparatus claimed in claim 2, wherein said second slanted pin and said second slanted guide roller of said second movable means are provided on an arm rotatably supported on said fixed chassis.

7. The apparatus claimed in claim 6, wherein said arm is rotated and positioned by a cam gear rotatably supported on said fixed chassis.

* * * * *